(12) United States Patent
Guth

(10) Patent No.: US 9,908,193 B2
(45) Date of Patent: Mar. 6, 2018

(54) DUST GUARD FOR CIRCULAR SAWS

(71) Applicant: JPL Global, LLC, Moreno Valley, CA (US)

(72) Inventor: Paul W Guth, Menifee, CA (US)

(73) Assignee: JPL Global, LLC, Moreno Valley, CA (US)

( * ) Notice: Subject to any disclaimer, the term of this patent is extended or adjusted under 35 U.S.C. 154(b) by 14 days.

(21) Appl. No.: 14/179,260

(22) Filed: Feb. 12, 2014

(65) Prior Publication Data

US 2014/0223748 A1    Aug. 14, 2014

Related U.S. Application Data

(60) Provisional application No. 61/763,778, filed on Feb. 12, 2013.

(51) Int. Cl.
*B23D 59/00* (2006.01)
*B27G 19/04* (2006.01)

(52) U.S. Cl.
CPC ........... *B23D 59/006* (2013.01); *B27G 19/04* (2013.01)

(58) Field of Classification Search
CPC ..... B27G 19/02; B27G 19/04; Y10T 83/7734; Y10T 83/606; Y10T 83/872; Y10T 83/732; Y10T 83/96; B23Q 11/06; B23Q 11/0825; B23Q 11/0046; B28D 1/045; B28D 1/047; B28D 7/02; B23D 59/006; B24B 55/052
USPC .......... 83/478, 397, 440.2, DIG. 1; 451/451, 451/251.1; 30/390, 391; D8/66; 144/251.1; 125/13.01
See application file for complete search history.

(56) References Cited

U.S. PATENT DOCUMENTS

| 2,274,421 | A | * | 2/1942 | Lindstrom | ............... A01G 3/08 30/286 |
| 2,589,309 | A | * | 3/1952 | Tompkins | .............. B27G 19/02 144/253.1 |
| 2,669,264 | A | * | 2/1954 | Wilson | ................... B27G 19/02 144/251.1 |
| 3,805,639 | A | * | 4/1974 | Peter | ..................... B23Q 11/06 30/391 |
| D257,015 | S | * | 9/1980 | Barr | ............................... D11/4 |
| 4,711,055 | A | * | 12/1987 | Mickos | .................. B23Q 11/06 125/13.01 |
| 5,235,753 | A | * | 8/1993 | Stumpf | .................. B27G 19/04 30/390 |

(Continued)

FOREIGN PATENT DOCUMENTS

| GB | 2373746 | 3/2001 |
| JP | 11138334 | 5/1999 |
| JP | 2012176598 | 9/2012 |

OTHER PUBLICATIONS

PCT/US2014/016093. Int'l Search Report & Written Opinion (dated Jun. 11, 2014), 6 pp.

*Primary Examiner* — Laura M Lee
(74) *Attorney, Agent, or Firm* — Loza & Loza, LLP; Daniel Castro

(57) ABSTRACT

An improved design for a dust shroud providing an airflow conduit for collecting dust off a work piece and a saw blade is disclosed. The dust shroud is configured with either one or two extending and telescoping lower rigid jaws that are durable and can engage a work piece at different angles. A novel roller is additionally provided for moving along a work piece.

8 Claims, 5 Drawing Sheets

(56) References Cited

U.S. PATENT DOCUMENTS

| | | | | |
|---|---|---|---|---|
| 5,537,748 A | * | 7/1996 | Takahashi | B23D 59/006 30/124 |
| 5,542,183 A | * | 8/1996 | Allison | A62B 3/005 30/276 |
| 5,752,421 A | * | 5/1998 | Chang | B27G 19/02 83/397 |
| 5,893,311 A | | 4/1999 | Huang | |
| 6,155,246 A | * | 12/2000 | Yamami | B08B 15/04 125/13.01 |
| 6,182,548 B1 | * | 2/2001 | Meredith | B23D 45/048 83/397 |
| 6,233,831 B1 | | 5/2001 | Iida et al. | |
| 6,318,352 B1 | * | 11/2001 | Gnazzo | B23D 59/006 125/12 |
| 6,722,046 B2 | * | 4/2004 | Evenson | B23D 45/16 30/391 |
| 7,020,970 B1 | * | 4/2006 | Welch | B27G 19/04 30/391 |
| 7,571,720 B2 | | 8/2009 | Donnerdal et al. | |
| 8,011,398 B2 | | 9/2011 | Loveless et al. | |
| 8,061,044 B2 | | 11/2011 | Saitoh | |
| 8,381,711 B2 | | 2/2013 | Loveless | |
| 9,021,930 B2 | * | 5/2015 | Kani | B23D 45/048 30/374 |
| 2003/0041717 A1 | * | 3/2003 | Evenson | B23D 45/16 83/663 |

\* cited by examiner

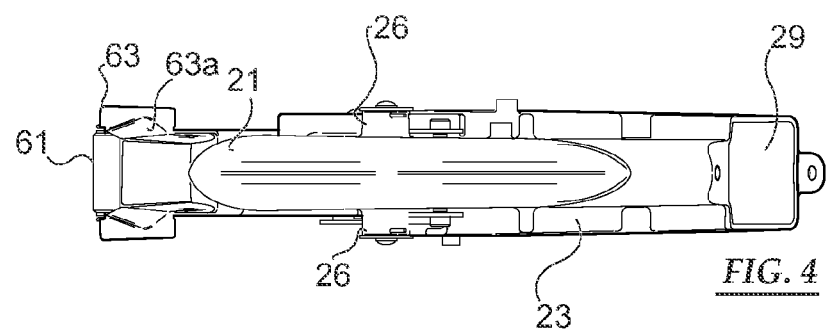
FIG. 4
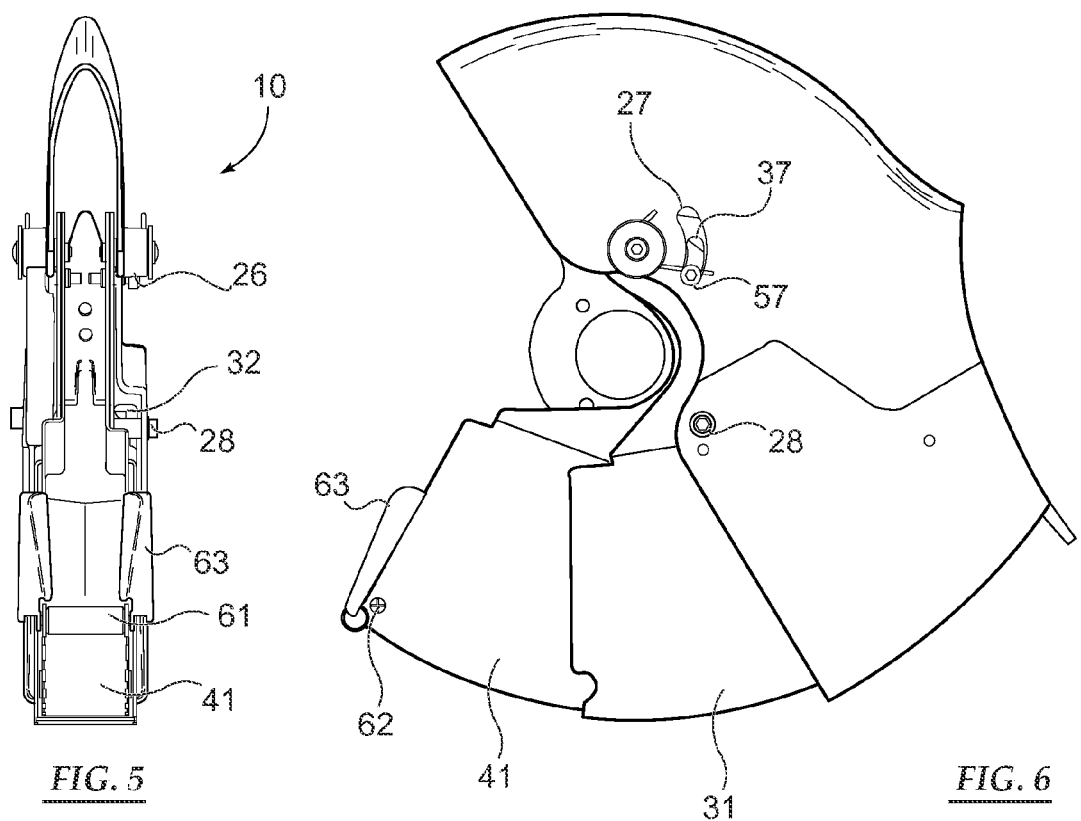
FIG. 5
FIG. 6

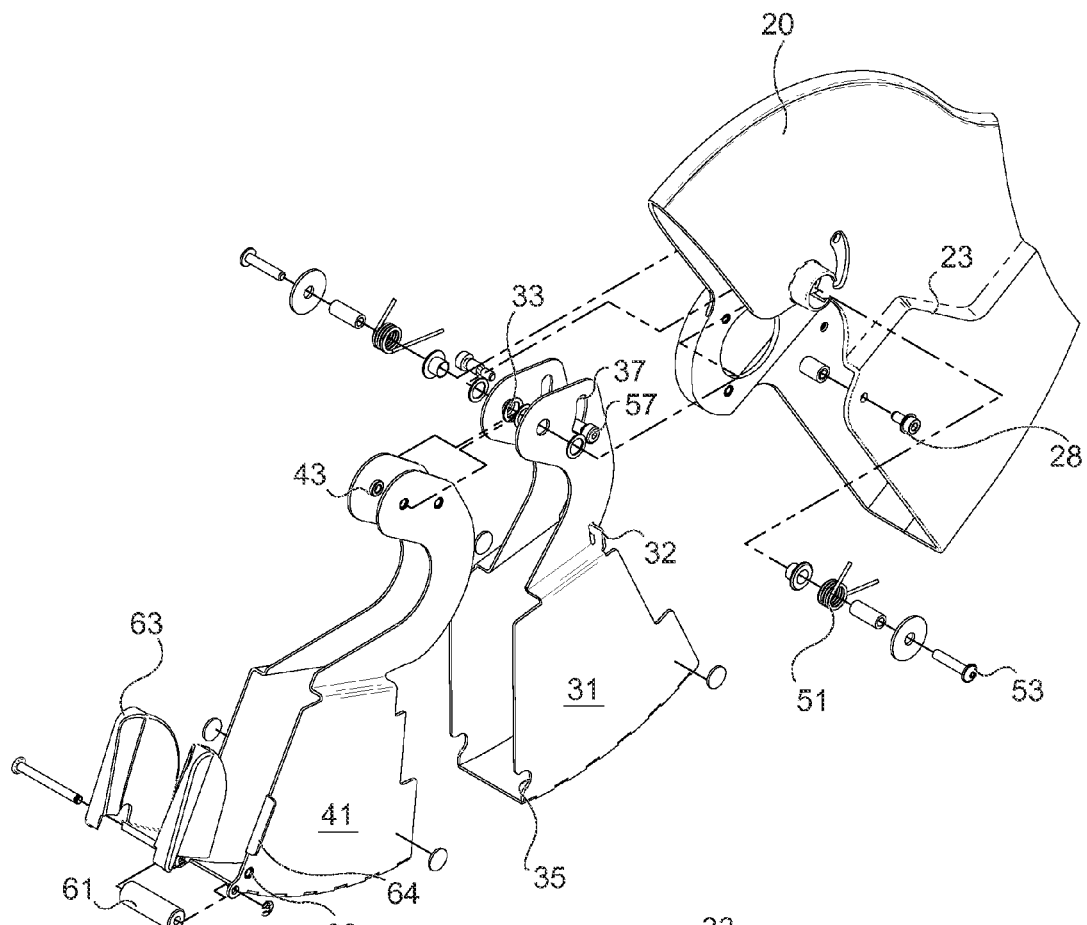
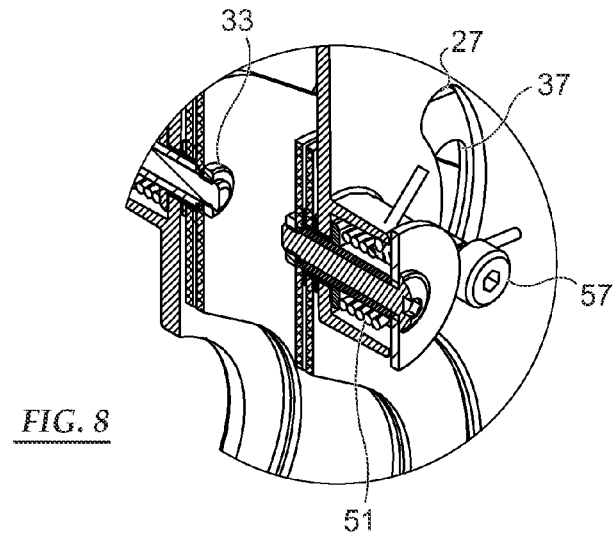
FIG. 7
FIG. 8

DUST GUARD FOR CIRCULAR SAWS

BACKGROUND OF THE INVENTION

Field of the Invention

The present invention pertains generally to masonry and carpentry saws. Particularly, the present invention relates to cutting tool devices and methods to maximize containment of dust while cutting cinder block, concrete, brick, clay, stone, tile, wood, and the like. More specifically, the invention pertains to a dust guard configured to a circular saw setting up a conduit for suctioning dust.

Description of the Prior Art

Devices for grinding or cutting masonry or stone materials have been known for some time. Also known, is a problem of uncontrolled release of and exposure to airborne dust and particulate matter as a by-product from the grinding and cutting. As a result, government agencies such as OSHA have promulgated safety and health requirements for wet and dry cutting. In addition to health issues, the dust by-products present a clean-up challenge, even if all individuals in a contained environment have donned respirators.

Many prior art solutions have been proposed that specifically employ dry means to control dust. Still other examples specifically provide a dust shroud (or dust guard) configured to a saw blade and forming a conduit for collecting dust off a work piece. One such example was proposed by Loveless et al. entitled "Dust Shroud for Gas Powered Circular Saws," U.S. Pat. No. 8,011,398, and assigned to Dustless Depot, LLC. In this design, the dust shroud is configured to a leading edge of the circular saw blade. Also, the frontal shroud forms a conduit that leads dust away from a front of the saw. However, this configuration seems less than ideal. For example, a separate vacuum apparatus is needed with a vacuum hose, mobility and portability are restricted.

Still another related dust shroud was patented by Loveless also assigned to Dustless Depot, LLC, entitled "Universal Dust Collection Shroud for High Speed Gas Powered Saws," U.S. Pat. No. 8,381,711. In this example, a side exhaust port is coupled to a power saw shroud. Some drawbacks, however, are that the geometry is very asymmetrical and awkward; and it will not retract across a work piece, thereby providing less suction to dust coming off a work piece that can be achieved.

Yet another similar dust shroud was disclosed by present inventor, Guth entitled "Power Saw Apparatus with Integrated Dust Collector," U.S. Pub. Pat. App. No. 2011/0079207. This earlier design comprises a flexible bellows (dust guard) framed by a rigid upper shroud (FIG. 1). While the design is a major improvement over previous dust collection devices and methods, there may still remain some drawbacks to that particular solution. Initially, the flexible bellows is relatively difficult to manufacture. Also, the flexible design is prone to deform and may be forced into the blades further damaging the bellows. The dust guard herein seeks to proved strength and longevity to the device.

In light of the above, it is an object of the present invention to provide a dust guard for circular saws that provides added durability to that particular component. It is an additional object of the present invention to provide lower jaw having a leading edge that may be configured with attachments for cutting at different angles.

BRIEF SUMMARY OF THE INVENTION

The present invention specifically addresses and alleviates the above mentioned deficiencies associated with the prior art. More particularly, the present invention in a first aspect, is dust guard for providing an air flow conduit at a saw blade comprising: an upper shroud surrounding an upper portion of the saw blade providing an air flow conduit as well as housing and providing safety to a saw user; a lower shroud surrounding a rear lower portion of the saw blade the lower shroud comprising a rear exit for dust and air flow; a telescoping jaw rotating about a pivot point with respect to the upper and lower shroud; and a spring coupling the telescoping jaw to the upper shroud configured such that a spring force holds the telescoping jaw fully extended in an open position, wherein further a fully retracted position comprises a force opposite spring force.

The invention in this aspect is additionally characterized in that the dust guard may have a telescoping jaw with one or two telescoping portions (i.e. a middle jaw telescoping with respect to the lower shroud; and a forward jaw telescoping with respect to the middle jaw). Additionally further, the forward jaw comprises: a roller at a horizontal leading edge of said forward jaw; and a first scoop having a first angled surface removably secured with respect to the forward jaw, the first scoop providing a guide for making angled cuts; and a second scoop removably secured with respect to the forward jaw and interchangeable with respect to the first scoop, the second scoop providing a second angled surface with respect to the first scoop angled surface.

The dust guard in this aspect in additionally characterized as comprising: a tab at a rear end of the middle jaw; a ridge wall at a junction between the upper shroud and the lower shroud, the ridge wall providing a rear stop against the tab when the middle jaw is fully retracted; and a bump stop coupled to the lower dust shroud, the bump stop contacting the tab and providing a forward stop when the middle jaw is fully extended.

The dust guard for providing an air flow conduit at a saw blade in this aspect is additionally characterized as further comprising a flange configured between the upper shroud and the lower shroud, the flange concentric to the saw blade. Also, the invention is further defined wherein the spring comprises a helical torsion spring and is configured about the pivot point, and wherein further the spring comprises an arm coupled to a horizontal shoulder screw, the horizontal screw coupled to the telescoping jaw. Further, the horizontal screw is configured though a slot in the upper shroud wherein the horizontal screw slides along a slot length as the telescoping jaw rotates with respect to the upper shroud.

The slot herein is additionally characterized as a first slot, wherein the telescoping jaw further comprises a forward jaw and a middle jaw, the middle jaw further comprising an inner slot configured within the first slot and having a shorter length, wherein when the horizontal screw travels the length of the inner slot, the horizontal screw contacts an end of said inner slot and further moves the middle jaw a remaining distance along the first slot as the forward jaw and middle jaw fully retract and extend.

The invention can be better visualized by turning now to the following drawings wherein like elements are referenced by like numerals.

These, as well as other advantages of the present invention will be more apparent from the following description and drawings. It is understood that changes in the specific structure shown and described may be made within the scope of the claims, without departing from the spirit of the invention.

While the apparatus and method has or will be described for the sake of grammatical fluidity with functional explanations, it is to be expressly understood that the claims, unless expressly formulated under 35 USC 112, are not to be construed as necessarily limited in any way by the construction of "means" or "steps" limitations, but are to be accorded the full scope of the meaning and equivalents of the definition provided by the claims under the judicial doctrine of equivalents, and in the case where the claims are expressly formulated under 35 USC 112 are to be accorded full statutory equivalents under 35 USC 112. The invention can be better visualized by turning now to the following drawings wherein like elements are referenced by like numerals.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which:

FIG. 4 is top plan view thereof;

FIG. 5 is a front view of the embodiment;

FIG. 6 is an additional enlarged profile view of the present invention;

FIG. 7 is an exploded view thereof showing all components;

FIG. 8 is an enlarged view of components circumscribed by line 8 in FIG. 1; and

DETAILED DESCRIPTION OF THE PREFERRED EMBODIMENTS

Figure 1:
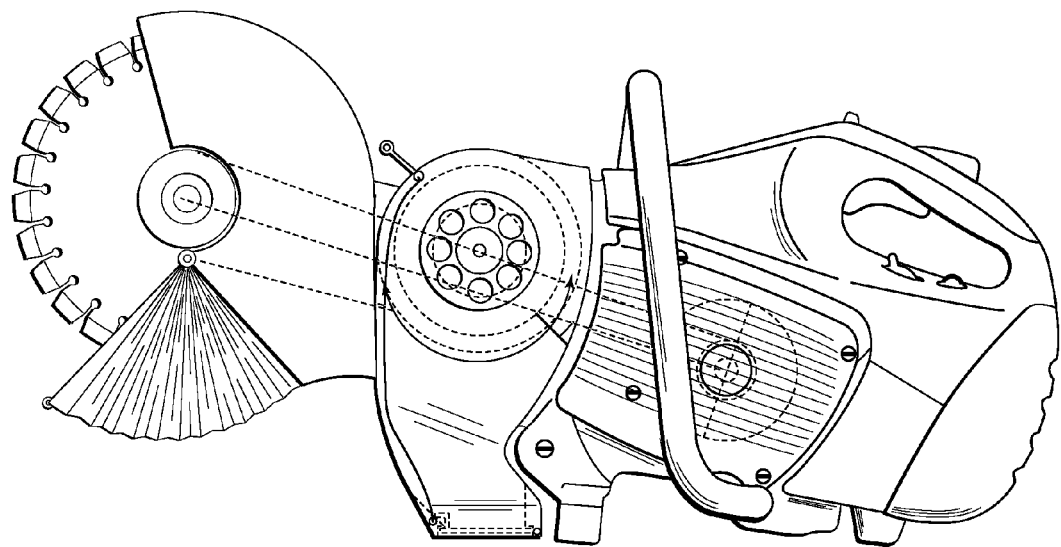
FIG. 1 is a prior art blade guard device with a flexible retractable bellows configured as a lower jaw to the blade guard device.
Figure 2:
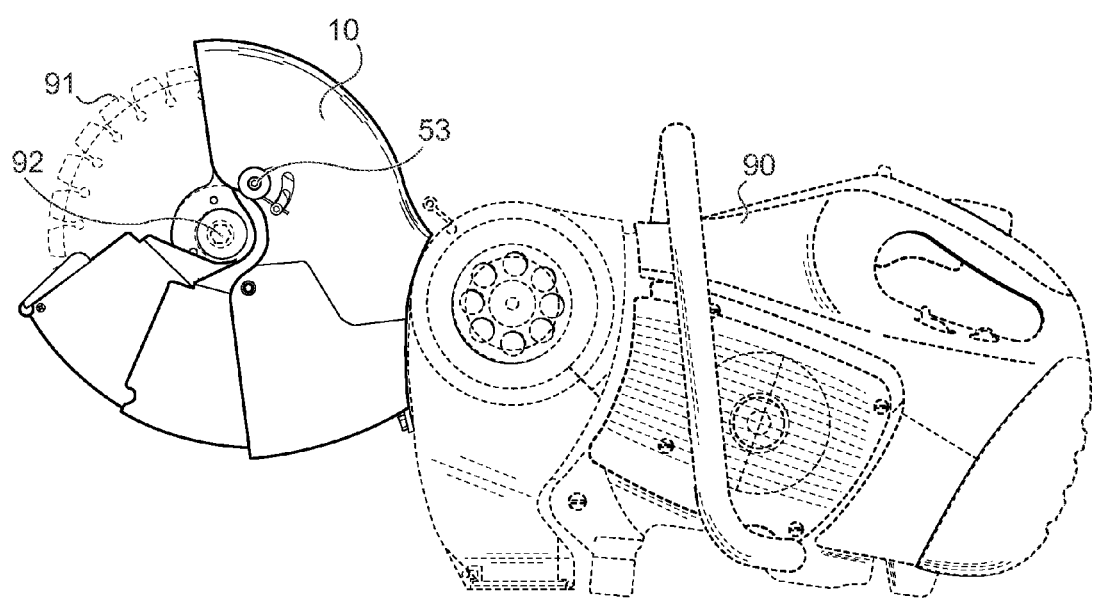
FIG. 2 is a first profile view of the present invention.
Figure 3:
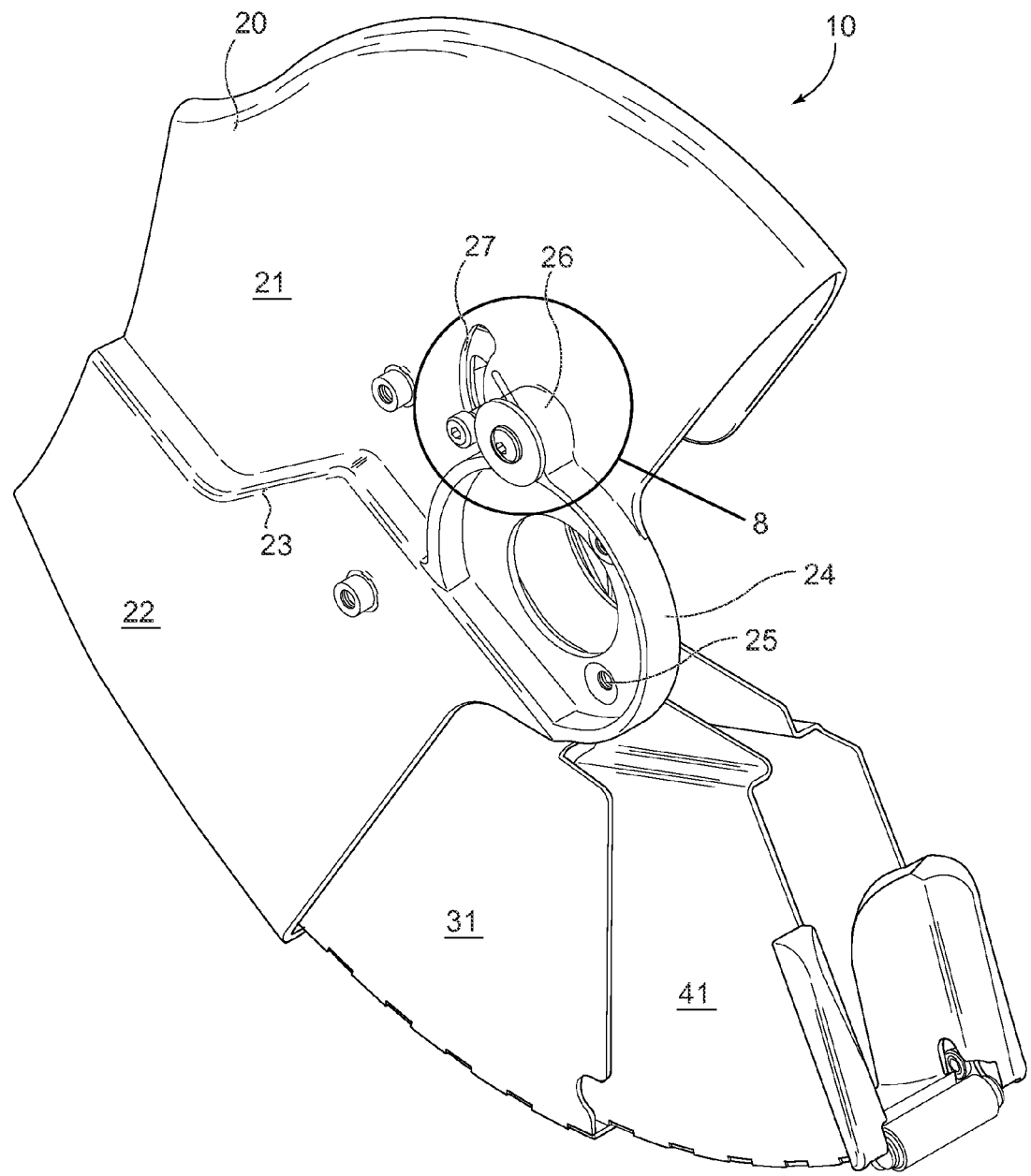
FIG. 3 is a perspective view of the dust guard for circular saws.

Referring initially to the FIG. 2 and FIG. 3, a first improved blade guard 10 (coupled to saw 90) is illustrated having a shroud 20 with upper 21 and lower 22 portions generally protecting an upper and rear lower blade 91. The shroud 20 upper and lower portions are one piece with the lower portion being wider to accommodate retracting and telescoping lower jaws 31, 41 as further detailed herein. The telescoping lower jaws 31, 41 together provide an enclosure about a lower blade 91, and importantly provide a dust conduit capable of holding a negative pressure with respect to atmosphere therein. Also as detailed herein, the lower jaws 31, 41 rotate about an axis (pivot) 53 slightly above and inward of the circular saw 91 axis 92. Also, a circular flange 24 at the shroud portion 20 configured to one side or the other for coupling to a fixed portion of the saw 90 via apertures 25 having extra material carved out thereof to accommodate a screw or bolt fastener head. A spring housing 26 further protrudes outwardly from the upper shroud 21 provided to contain a spring 51, wherein torsion spring force maintains lower jaws 31, 41 fully extended. Telescoping herein is essentially defined as forcing into one another in the manner of sliding tubes of a telescope. As claimed herein, the telescoping jaw 31, 41 comprises forward jaw 41 and middle jaw 31 telescoping with respect to lower shroud 21.

With regard to FIG. 4, a top plan view is provided for the dust guard 10. Here it is revealed that the spring housing protrudes from either side of the device 10; and hence, the jaws 31, 41 move against the spring 51 force. However, the invention 10 would still function with only one spring 51 to either side. At a rear portion of the lower shroud 22, a conduit 29 is formed where dust would exit rearwardly to a filter chamber and a dust holding area. At a forward end of the dust guard 10 and at a leading edge of the forward jaw 41, a roller is configured thereto to roll along a work piece while cuts are being made thereto. Also configured to said leading edge and around the roller, a scoop 63 is removably configured thereto for guiding specific angle cuts to a work piece via angled slope 63a. With regard to FIG. 5, a front view of the present invention 10 is provided. Herein, alternative views are provided showing the forward jaw 41 having a roller 61 and a scoop 63 configured thereto.

Figure 9:
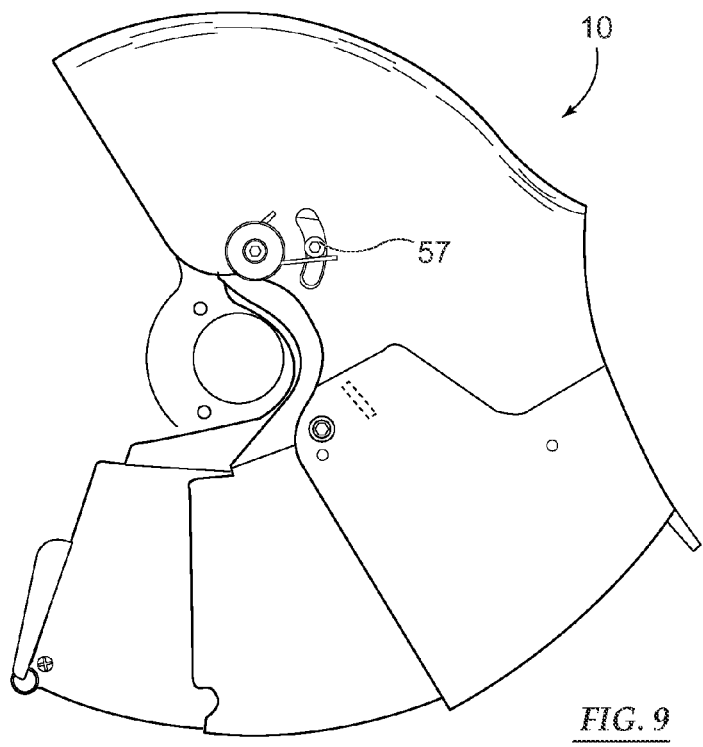
FIG. 9 and FIG. 10 are additional profile views illustrating how the lower jaws of the present invention retract.
Figure 10:
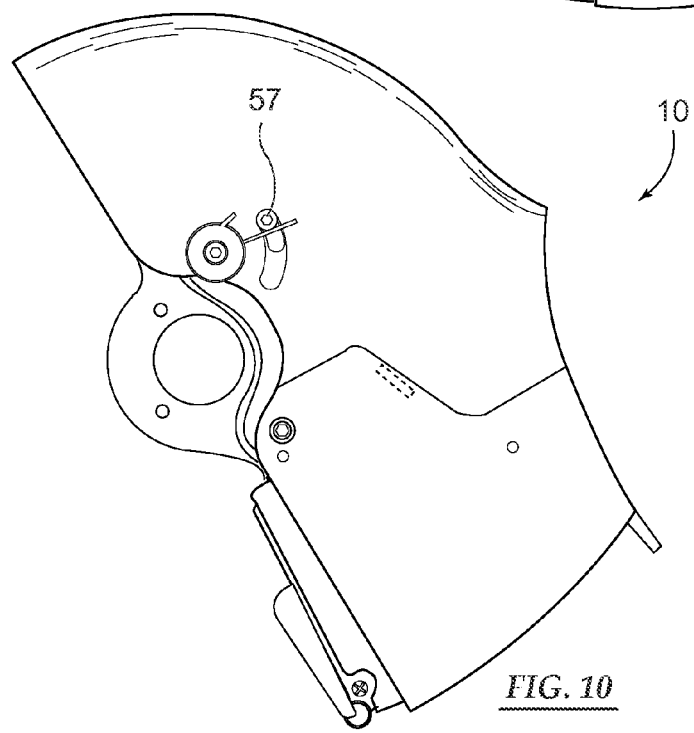

FIG. 6 provides an additional enlarged profile view of the invention embodiment 10. As shown, a slot 27 is provided in the upper shroud 21 for movement of a horizontal spring retaining shoulder screw 57 forced upward by the spring 51 force and moving along the slot 27 as pressure is placed on the lower shroud 41 as a leading edge thereof is moved along a work piece. Hence, spring retaining shoulder screw 57 is coupled to the forward jaw 41. An inner slot 37 is provided to the middle jaw 31; however, the inner slot 37 is smaller in length, so that when horizontal screw 57 travels the length of the inner slot 37 it will hit an end of said slot 37 and further move the middle jaw the rest of the way along slot 27 as shown in FIG. 9 and FIG. 10.

Also with regard to FIG. 5, FIG. 6 and further FIG. 7, a bump stop 28 is coupled to the lower shroud 22 and limits forward motion when the device 10 is fully extended by spring force 53. Tab 32 provides the extended portion against the bump stop 28. Conversely at the retracted range of motion, tab 32 will hit ridge wall 23 at the fully retracted position illustrated by FIG. 11.

FIG. 7 provides an exploded view of all components. At the forward end, an aperture 62 is provided to removably secure the scoop 63 having angled surface 63a for making specific cuts to a work piece. Circular carve out 35 is configured to middle jaw 31 forward edge to fit around aperture 62 and any screw or bolt configured thereto. As stated, the jaws 31, 41 rotate about a pivot 33, 43, 53 that is above and rearward of saw blade 91 center. Hence, concentric apertures 33, 43 are provided overlapping having the spring pin 53 there through. FIG. 8 is an enlarged view of area bound by line 8 in FIG. 3, however from an opposite side since both sides are identical. As shown, spring 51 is coupled to horizontal shoulder screw 57 further being coupled to the forward jaw 41. The view also provides closer inspection of outer 27 and inner 37 slots.

Importantly, the invention comprises in alternative embodiments, one telescoping or two telescoping jaws, 31, 41 that are rigid and can engage a work piece at different angles 63a via different scoops 63. Tabs 64 and mounting holes 62 are further provided at said leading edge for mounting different scoops 63 thereto. The scoops 63 assist in making cuts from various angles as well as various positions relative to the work piece.

Also with reference to FIG. 7, the forward jaw 41 comprises a roller 61 configured horizontally at a leading edge (or lower portion of the leading edge of jaw 41). The roller 61 is configured thereto for rolling across a workpiece while cuts are being made. As stated, the jaws 31, 41 are retractable with an opposing force (typically pressing against a work piece) against helical torsion spring 51 force.

While the particular Dust Guard for Circular Saws as herein shown and disclosed in detail is fully capable of obtaining the objects and providing the advantages herein before stated, it is to be understood that it is merely illustrative of the presently preferred embodiments of the invention and that no limitations are intended to the details of construction or design herein shown other than as described in the appended claims.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

What is claimed is:

1. A dust guard for providing an air flow conduit at a saw blade comprising:
   an upper shroud surrounding an upper portion of the saw blade and providing an air flow conduit;
   a lower shroud surrounding a rear lower portion of the saw blade, the lower shroud comprising a rear exit for dust and air flow;
   a telescoping jaw configured to retract into the lower shroud and rotating about a pivot point with respect to the upper and lower shroud; and
   a spring directly coupling the telescoping jaw to the upper shroud and configured such that a spring force holds the telescoping jaw in a fully extended position, wherein the spring force provides a force against the telescoping jaw as the telescoping jaw is retracted towards a retracted position, the spring further comprising an arm coupled to a horizontal screw, wherein the horizontal screw is coupled to the telescoping jaw and configured to slide along and within a slot in the upper shroud as the telescoping jaw rotates with respect to the upper shroud.

2. The dust guard for providing an air flow conduit at a saw blade of claim 1, the telescoping jaw further comprising:
   a middle jaw telescoping with respect to the lower shroud; and
   a forward jaw telescoping with respect to the middle jaw.

3. The dust guard for providing an air flow conduit at a saw blade of claim 2, the forward jaw further comprising:
   a roller at a horizontal leading edge of said forward jaw;
   a first scoop having a first angled surface removably secured with respect to the forward jaw, the first scoop providing a guide for making angled cuts; and
   a second scoop removably secured with respect to the forward jaw, the second scoop providing a second angled surface with respect to the first angled surface of the first scoop.

4. The dust guard for providing an air flow conduit at a saw blade of claim 2, further comprising:
   a tab at a rear end of the middle jaw;
   a ridge wall at a junction between the upper shroud and the lower shroud, the ridge wall providing a rear stop against the tab when the middle jaw is fully retracted; and
   a bump stop coupled to the lower dust shroud, the bump stop contacting the tab and providing a forward stop when the middle jaw is fully extended.

5. The dust guard for providing an air flow conduit at a saw blade of claim 1, further comprising a flange configured between the upper shroud and the lower shroud, the flange concentric to the saw blade.

6. The dust guard for providing an air flow conduit at a saw blade of claim 1, wherein the spring comprises a helical torsion spring and is configured about the pivot point.

7. The dust guard for providing an air flow conduit at a saw blade of claim 6, wherein the slot is a first slot, wherein the telescoping jaw further comprises a forward jaw and a middle jaw, the middle jaw further comprising an inner slot configured alongside and parallel to the first slot and having a shorter length, wherein when the horizontal screw travels a length of the inner slot, the horizontal screw contacts an end of said inner slot and further moves the middle jaw a remaining distance along the first slot as the forward jaw and middle jaw fully retract and extend.

8. The dust guard for providing an air flow conduit at a saw blade of claim 1, wherein the telescoping jaw is configured to form an enclosure about a lower portion of the saw blade that provides a dust conduit capable of holding a negative pressure with respect to atmosphere.

* * * * *